US009091198B2

(12) United States Patent
Suzuki

(10) Patent No.: US 9,091,198 B2
(45) Date of Patent: Jul. 28, 2015

(54) INSULATOR AND EXHAUST SYSTEM OF INTERNAL-COMBUSTION ENGINE

(75) Inventor: Daisuke Suzuki, Aichi (JP)

(73) Assignee: IBIDEN CO., LTD., Gifu (JP)

( * ) Notice: Subject to any disclaimer, the term of this patent is extended or adjusted under 35 U.S.C. 154(b) by 893 days.

(21) Appl. No.: 13/005,662

(22) Filed: Jan. 13, 2011

(65) Prior Publication Data
US 2011/0180174 A1    Jul. 28, 2011

(30) Foreign Application Priority Data

Jan. 22, 2010 (JP) .................. 2010-012502

(51) Int. Cl.
| B32B 3/06 | (2006.01) |
|---|---|
| B32B 3/10 | (2006.01) |
| B32B 15/00 | (2006.01) |
| B32B 17/06 | (2006.01) |
| F16L 9/14 | (2006.01) |
| F01N 13/14 | (2010.01) |
| F16L 59/02 | (2006.01) |

(52) U.S. Cl.
CPC .............. *F01N 13/14* (2013.01); *F16L 59/028* (2013.01); *Y10T 428/24612* (2015.01); *Y10T 428/249921* (2015.04)

(58) Field of Classification Search
CPC .................. F01N 13/14; F16L 59/028; Y10T 428/24612; Y10T 428/249921
USPC ................. 138/137, 139, 140–143, 147, 149; 123/65 EM; 181/227, 228; 428/58, 74, 428/75, 99, 100, 131, 133, 137, 156, 174, 428/175, 215, 223, 231, 432, 457, 920; 29/432, 515, 521
See application file for complete search history.

(56) References Cited

U.S. PATENT DOCUMENTS

| 1,915,611 | A | * | 6/1933 | Miller | ....................... 52/794.1 |
|---|---|---|---|---|---|
| 3,553,920 | A | * | 1/1971 | Cole, Jr. | ................... 52/506.02 |
| 3,921,258 | A | * | 11/1975 | Brumlik | ........................ 24/447 |
| 4,180,890 | A | * | 1/1980 | Brumlik | ........................ 24/449 |
| 4,265,953 | A | | 5/1981 | Close | |
| 4,512,130 | A | * | 4/1985 | Pepin | .......................... 52/404.2 |
| 4,911,972 | A | * | 3/1990 | Mercuri | ........................ 428/99 |

(Continued)

FOREIGN PATENT DOCUMENTS

| EP | 0 992 659 A2 | 4/2000 |
|---|---|---|
| JP | H07-119458 | 5/1995 |

(Continued)

OTHER PUBLICATIONS

Rupp, Juerg, Nonwovens/Technical Textiles: Needlepunched Nonwovens, Textileworld.com, Sep. 2008, Accessed Oct. 17, 2013, <http://www.textileworld.com/Articles/2008/September_2008/Nonwovens/Needlepunched_Nonwovens.html>.*

(Continued)

*Primary Examiner* — Patrick F Brinson
*Assistant Examiner* — Matthew Lembo
(74) *Attorney, Agent, or Firm* — IPUSA, PLLC

(57) ABSTRACT

An insulator having an inner surface for covering an exhaust system of an internal-combustion engine includes a cover member having a surface, a joint member formed on the surface of the cover member, and a mat member made of material including at least one of ceramic fibers and glass fibers, the mat member being attached to the cover member through binding of the fibers to the joint member, and the mat member being exposed to form the inner surface.

16 Claims, 10 Drawing Sheets

(56) References Cited

U.S. PATENT DOCUMENTS

| | | | |
|---|---|---|---|
| 5,181,319 A * | 1/1993 | Campbell, Jr. | 29/890.053 |
| 5,656,353 A * | 8/1997 | Butler | 428/133 |
| 5,863,635 A * | 1/1999 | Childress | 428/119 |
| 6,251,498 B1 | 6/2001 | Fukushima et al. | |
| 6,465,100 B1 * | 10/2002 | Johnson et al. | 428/408 |
| 6,555,070 B1 | 4/2003 | Krüger | |
| 7,013,536 B2 * | 3/2006 | Golden et al. | 24/442 |
| 7,117,578 B2 * | 10/2006 | Schnell | 29/505 |
| 2002/0168492 A1 | 11/2002 | Madono et al. | |
| 2008/0169038 A1 | 7/2008 | Sellis et al. | |
| 2009/0060802 A1 * | 3/2009 | Beauharnois | 422/177 |

FOREIGN PATENT DOCUMENTS

| | | |
|---|---|---|
| JP | 09-049426 | 2/1997 |
| JP | 2005-098209 | 4/2005 |
| JP | 2005-344968 | 12/2005 |
| JP | 2006-250054 | 9/2006 |
| JP | 4290376 | 7/2009 |

OTHER PUBLICATIONS

Tomkinson-Walles, Gayle D., Performance of Random Glass Mat Reinforced Thermoplastics, Journal of Thermoplastic Composite Materials, Jan. 1988 vol. 1, No. 1, pp. 94-106, Accessed Oct. 17, 2013 via Sage Journals, <http://jtc.sagepub.com/content/1/1/94>.*

Chen, Tengfei et al., Effects of Needle-Punched Felt Structure on the Mechanical Properties of Carbon/Carbon Composites, Elsevier, Carbon vol. 41, Issue 5, 2003, pp. 993-999, Accessed Oct. 17, 2013 via ScienceDirect.com, <http://www.sciencedirect.com/science/article/pii/S0008622302004451/pdfft?md5=02fe6376b5dab68e2b89e7a78c18c077&pid=1-s2.0>.*

* cited by examiner

INSULATOR AND EXHAUST SYSTEM OF INTERNAL-COMBUSTION ENGINE

BACKGROUND OF THE INVENTION

1. Field of the Invention

The disclosures herein relate to an exhaust system and an exhaust system insulator for an internal-combustion engine.

2. Description of the Related Art

An insulator is typically attached to an exhaust system such as an exhaust manifold or pipe of an internal-combustion engine for the purpose of preventing heat radiation and noise.

Patent Document 1 discloses an insulator that is made by assembling a metallic cover member, a mat member comprised of inorganic fiber, and an inorganic heat-resistant cloth member into an integrated structure. The mat member is attached to the inner surface of the cover member, and the cloth member is attached to the surface of the mat member. Tips of four arms of a cross-shaped washer prevent the mat member from becoming slack. Specifically, the four arms of the cross-shaped washer are bent inwards, and the washer is inserted into a space that is made by removing a portion of the mat member through a circular hole opened through the cloth member. The central part of the washer is then fixed to the cover member by spot welding.

The insulator of Patent Document 1 attached to an exhaust system of an internal-combustion engine allows an air current to enter the gap between the exhaust system and one of the cloth member and the cross-shaped washer. This results in the temperature of the exhaust system being lowered. Also, heat may be transferred from the exhaust system to the exposed cross-shaped washer situated opposite the exhaust system, thereby lowering the temperature of the exhaust system. As a consequence, the performance of exhaust gas purification may be lowered.

Further, the insulator disclosed in Patent Document 1 is configured such that the mat member is attached to the inner surface of the cover member. Attaching the mat member by use of an adhesive agent or the like gives rise to the problem of insufficient adhesion strength. The mat member may break away from the cover member due to heat or vibration.

[Patent Document 1] Japanese Patent Application Publication No. 9-49426

SUMMARY OF THE INVENTION

According to one embodiment, an insulator having an inner surface for covering an exhaust system of an internal-combustion engine includes a cover member having a surface, a joint member formed on the surface of the cover member, and a mat member made of material including at least one of ceramic fibers and glass fibers, the mat member being attached to the cover member through binding of the fibers to the joint member, and the mat member being exposed to form the inner surface.

According to one embodiment, an exhaust system for an internal-combustion engine includes a tubular member through which exhaust gas travels and an insulator having an inner surface to cover an outer surface of the tubular member. The insulator includes a cover member having a surface, a joint member formed on the surface of the cover member, and a mat member made of material including at least one of ceramic fibers and glass fibers, the mat being attached to the cover member through binding of the fibers to the joint member, and the mat being exposed to form the inner surface.

According to at least one embodiment, an insulator is provided that has superior strength against heat and that can suppress the lowering of temperature of an exhaust system of an internal-combustion engine. Also, an exhaust system of an internal-combustion engine equipped with such an insulator is provided.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments will be described by referring to the accompanying drawings.

Figure 1:
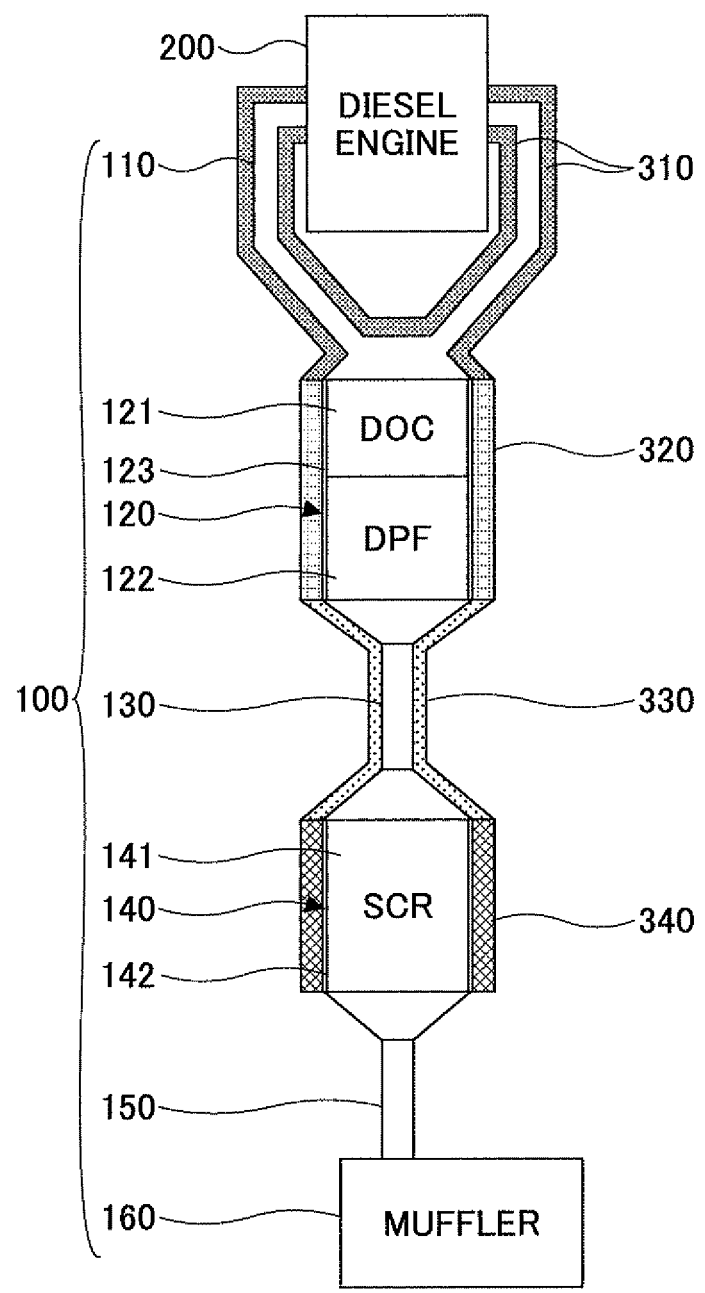
FIG. 1 is an illustrative drawing illustrating an embodiment of an exhaust system of an internal-combustion engine.

FIG. 1 is a drawing illustrating an example of an embodiment of an internal-combustion engine exhaust system. An exhaust system 100 of a diesel engine includes an exhaust manifold 110 through which exhaust gas from a diesel engine 200 flows, a purification apparatus 120 for purifying the exhaust gas having passed through the exhaust manifold 110, an exhaust pipe 130 through which the exhaust gas purified by the purification apparatus 120 flows, a purification apparatus 140 for purifying the exhaust gas having passed through the exhaust pipe 130, an exhaust pipe 150 through which the exhaust gas purified by the purification apparatus 140 flows, and a muffler 160 which discharges the exhaust gas having passed through the exhaust pipe 150.

An insulator 310 is attached to the outer surface of the exhaust manifold 110 in a detachable manner.

Figure 2:
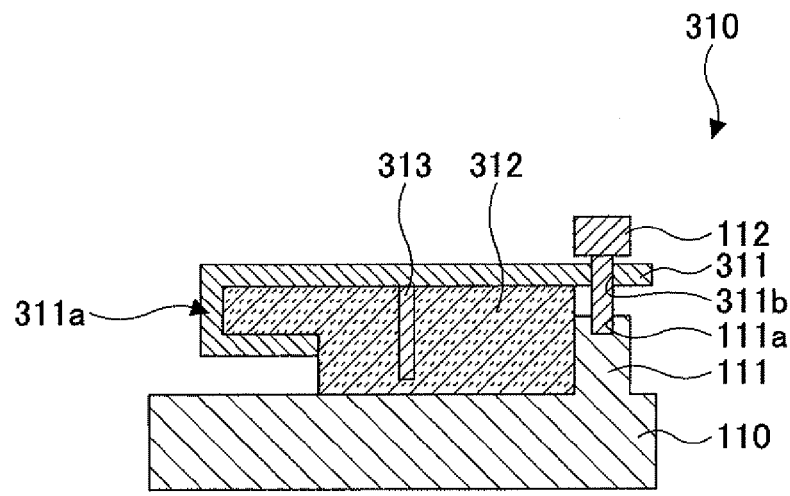
FIG. 2 is a cross-sectional view of the insulator of FIG. 1.

As illustrated in FIG. 2, a stud 313 is formed on a cover member 311 that is made of an aluminum-coated steel plate. A mat member 312 made of silica alumina fiber is fixed to the cover member 311 by the stud 313. The mat member 312 is pressed against the cover member 311, so that the protruding stud 313 serving as a joint member pierces and intrudes into the depth of the mat member 312. As a result, fibers of the mat member 312 are entangled with and thus bound to the stud 313, which fixedly mounts the mat member 312 to the insulator 310 in a stable manner. The inner surface of the insulator 310 is constituted by the mat member 312 that is in an exposed state. The insulator 310 is fixed to the exhaust manifold 110 such that the mat member 312 is in close contact with the exhaust manifold 110 without a space therebetween. Namely, the mat member 312 is in direct contact with the outer surface of the exhaust manifold 110 in the place where the mat member 312 is exposed. It may be noted that a side end of the mat member 312 is tightly covered, without any intervening space, by a folding part 311a formed at the corresponding side end of the cover member 311. Since the mat member 312 is placed in close contact with the exhaust manifold 110 without any intervening space, no gap is created between the exhaust manifold 110 and the cover member 311, thereby suppressing a temperature drop of the exhaust manifold 110. Consequently, this arrangement successfully prevents the lowering of performance of the purification apparatuses 120 and 140 in terms of purification of exhaust gas.

The flexible nature of the mat member 312 ensures that the mat member 312 closely covers the exhaust manifold 110 without any intervening space even if the exhaust manifold 110 has a complex shape. This suppresses the lowering of temperature of the exhaust manifold 110.

Figure 3:
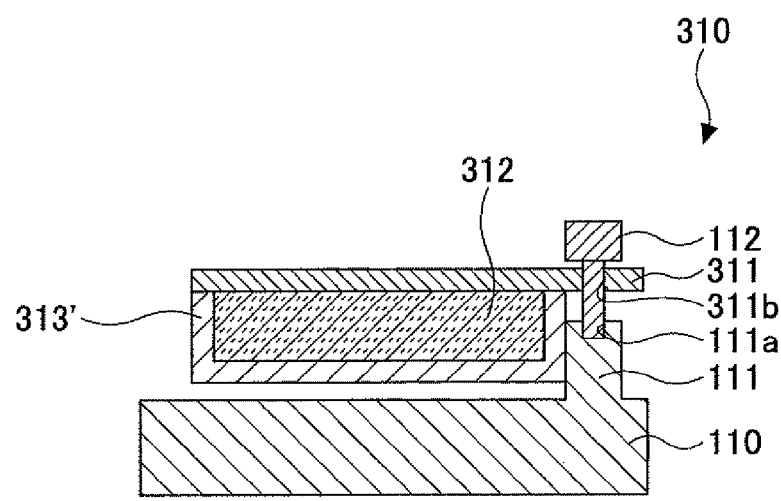
FIG. 3 is a cross-sectional view of an insulator illustrated for comparison with the insulator of FIG. 1.

In an arrangement illustrated in FIG. 3 for comparison purposes, the stud 313 is not used, and a stainless steel mesh 313' fixed to the cover member 311 by spot welding is used instead. The mat member 312 is held between the cover member 311 and the mesh 313', with a gap created between the exhaust manifold 110 and the cover member 311. This configuration allows an air current to flow into the gap, thereby allowing the temperature of the exhaust manifold 110 to drop. As a consequence, the performance of exhaust gas purification is lowered.

In FIG. 2, the cover member 311 has the folding part 311a formed at the side end thereof, which prevents the mat member 312 from falling off from the side end. Further, the cover member 311 has a bolt hole 311b formed at the side end opposite to the side end at which the folding part 311a is formed.

The material of the cover member 311 is not limited to a particular material as long as the cover member 311 can be shaped to match the shape of the exhaust manifold 110. The cover member 311 may be made of iron, aluminum, copper, stainless steel, or the like. The material is not limited to metal as long as it has sufficient strength against heat and vibration.

The thickness of the cover member 311 is not limited to a particular thickness as long as it exhibits sufficient strength to avoid damage caused by engine vibration. The thickness may typically be 0.1 to 0.6 mm.

Surface treatment such as embossing and nimbus may be applied in order to improve the strength of the cover member 311. Further, two or more plates may be combined together for strength improvement.

Figure 4:
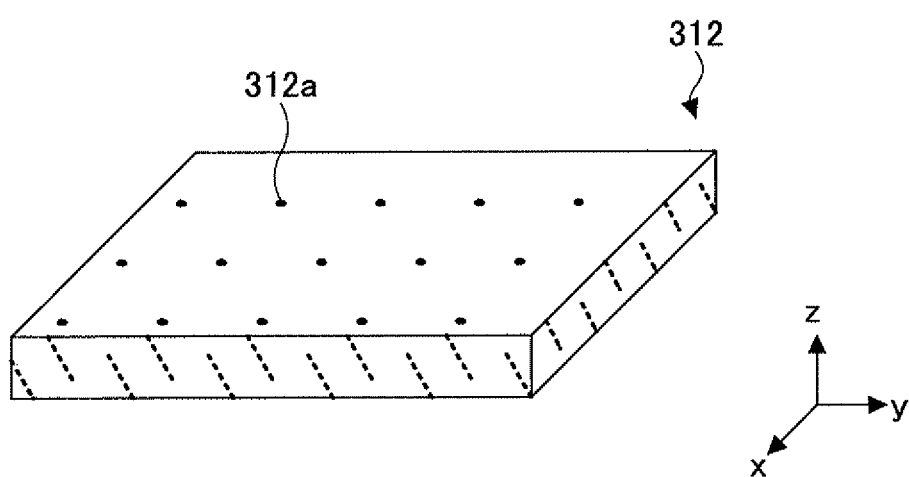
FIG. 4 is a perspective view illustrating a mat member of FIG. 2.
Figure 5A:
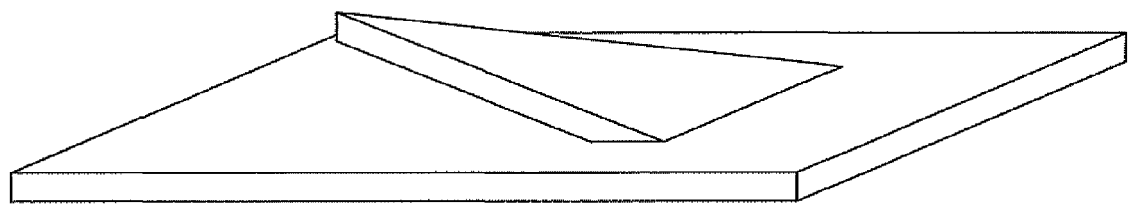
FIGS. 5A through 5D are perspective views illustrating examples of cover members on which one or more triangular claws are formed.
Figure 5B:
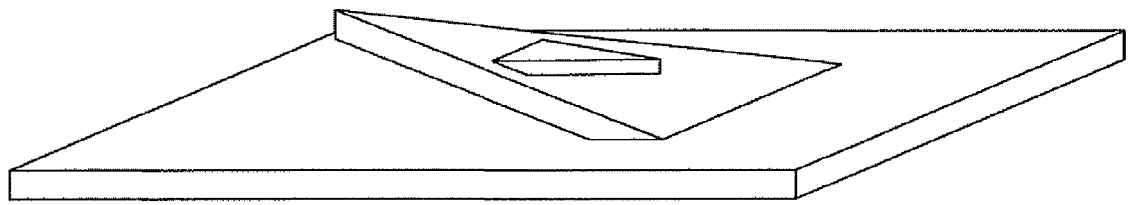
Figure 5C:
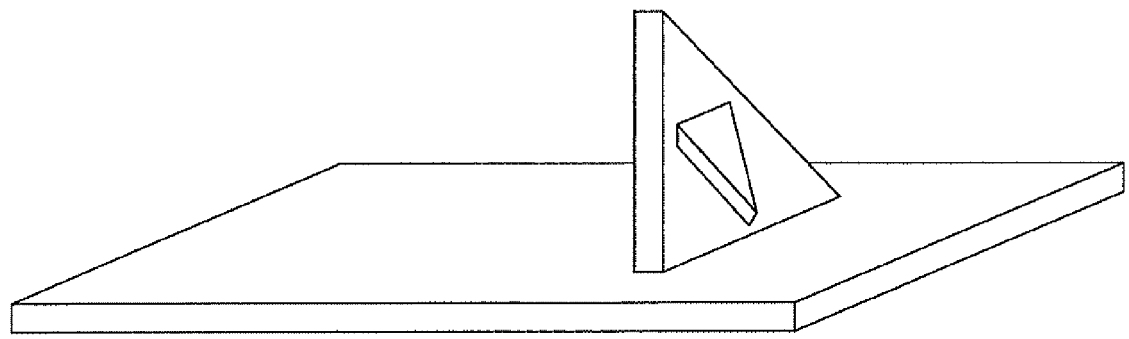
Figure 5D:
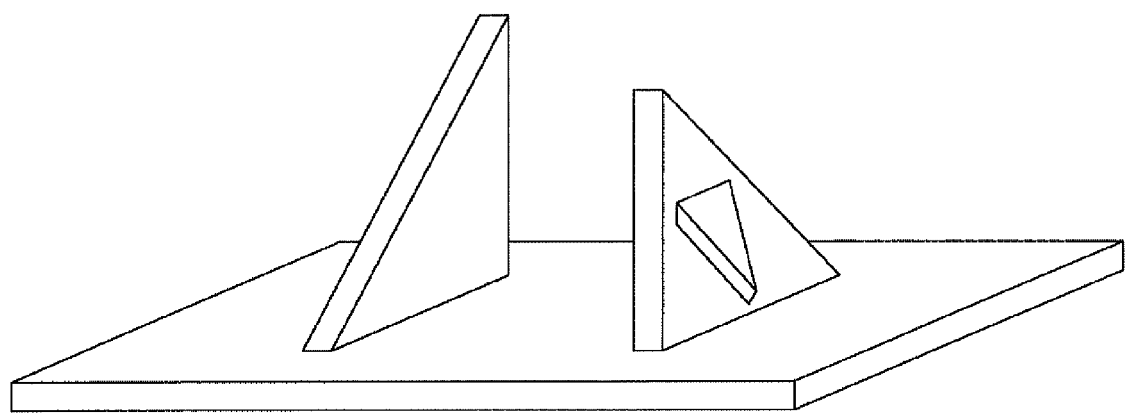

As illustrated in FIG. 4, the mat member 312 may have confounding points 312a formed by needling, which is performed from both the upper surface and the lower surface at an angle relative to the z axis that is defined as the thickness direction. With the confounding points 312a, the mat member 312 is more securely entangled with the stud 313.

The density of the confounding points 312a of the mat member 312 may typically be 20 per $cm^2$. It may preferably be in the range of 5 to 25 per $cm^2$.

In the following, an example of the method of producing the mat member 312 will be described.

An aqueous solution of basic aluminum chloride is prepared such that the contained amount of aluminum is 70 g/l, and the atomic ratio of aluminum to chloride is 1.8. Silica sol is added to the solution such that the composition ratio of alumina to silica is 60-80:40-20, and is more preferably 70-74:30-26. A composition ratio of alumina of 60% or more results in a large composition ratio of mullite generated from alumina and silica, thereby lowering the thermal conductivity of the mat member 312 and thus providing sufficient thermal insulation.

Subsequently, resin such as polyvinyl alcohol is added, followed by a condensing process to prepare spinning liquid. The spinning liquid is then used in fiber spinning performed by the blowing method.

The blowing method performs fiber spinning by using an air flow spurting from an air nozzle and a spinning liquid flow discharged from a spinning liquid nozzle. The speed of gas flow from the air nozzle per slit may typically be 40 to 200 m/second. The diameter of the spinning liquid nozzle may typically be 0.1 to 0.5 mm. The amount of spinning liquid supply per spinning liquid nozzle may typically be 1 to 120 ml/hour, and may preferably be 3 to 50 ml/hour. Under the conditions described above, spinning liquid discharged from the spinning liquid nozzle is sufficiently extended, and does not exhibit excessive adhesiveness. A sheet of silica alumina fiber precursor is thus obtained that has relatively uniform fiber diameters.

An average fiber length of the silica alumina fiber precursor may typically be no shorter than 250 micrometers, and may preferably be no shorter than 500 micrometers. An average fiber length of 250 micrometers or more ensures that silica alumina fiber precursors be sufficiently entangled, thereby providing sufficient strength. A diameter of the silica alumina fiber precursor may typically be 3 to 8 micrometers, and may preferably be 5 to 7 micrometers.

After the layers of silica alumina fiber precursor are stacked one over another, a needling apparatus is used to perform needling by which needles are inserted into and removed from the multilayer sheet. The needling apparatus has needles arranged in such a direction as previously described. The needling apparatus also has two needle boards that move back and forth for the purpose of insertion and removal of the needles, and has a pair of support plates that support the multilayer sheet. The needles on the needle board are arranged at a density of 25 to 5000 per 100 $cm^2$, for example. The pair of support plates has through-holes formed therein at the positions coinciding the positions of the needles formed on the two needle board. The two needle boards serve to perform needling with respect to the front surface and back surface of the multilayer sheet, respectively. The needles formed on the two needle boards are arranged such that their needling positions do not coincide with each other. The two needle boards are moved back and forth relative to the multilayer sheet held by the support plates, thereby causing the needles to be inserted into and removed from the multilayer sheet to create confounding points at which fibers are confounded (i.e., entangled). Fibers entangled in a complex fashion are oriented in the direction of needle movements at the confounding points, so that the strength of the multilayer sheet is improved.

The needling apparatus may be provided with a conveyor unit that conveys the multilayer sheet at a speed of 20 mm/second, for example.

The post-needling multilayer sheet is heated up from room temperature and burnt at the maximum temperature of approximately 1250 degrees Celsius for some duration, thereby producing the mat member 312 comprised of silica alumina fiber.

The produced mat member 312 has needling traces at which silica alumina fibers are locally, tightly entangled. The needle traces have a straight line shape oriented in the direction of needle movements. Fibers are oriented along the straight line, and are tightly entangled with each other. The mat member 312 is pressed against the cover member 311, so that a protruding joint member such as the stud 313, a claw, or a hook, which will be described later, pierces and intrudes into the depth of the mat member 312. As a result, the tightly entangled fibers of the needle traces are entangled with the stud 313, the claw, or the hook. The mat member 312 is thus fixed to the insulator 310 in a secure manner. Namely, the stud 313 or the like intrudes into the fibers that are tightly entangled in a complex manner at the needle traces, so that the fibers become entangled tightly around the stud 313 or the like. With this provision, the mat member 312 is unlikely to fall off when the insulator 310 is attached to or detached from the exhaust manifold 110.

The material of the mat member 312 is not limited to silica alumina fiber as long as it can suppress the lowering of temperature of the exhaust manifold 110. The material may be any one of or combination of alumina fiber, silica fiber, ceramic fiber such as rock wool, glass fiber, and the like. A fiber that contains no fewer than 50 mass % of alumina may preferably be used because of its ability to suppress fiber scattering and shape distortion.

The thickness of the mat member 312 may typically be 5 to 10 mm, more or less.

The bulk density of the mat member 312 may preferably be 0.15 to 0.55 g/cm$^3$. A bulk density of 0.15 g/cm$^3$ or more ensures that a gap is not likely to appear between the exhaust manifold 110 and the cover member 311, thereby helping to suppress the lowering of temperature of the exhaust manifold 110. Bulk density no larger than 0.55 g/cm$^3$ ensures that the insulator 310 is easily assembled to the exhaust manifold 110, and that the mat member 312 is not easily damaged.

In order to prevent an air current from intruding between the exhaust manifold 110 and the cover member 311, it is preferable to provide no space between the exhaust manifold 110 and the cover member 311. However, there is no need to avoid any kind of space between the exhaust manifold 110 and the cover member 311 across the entire area of the insulator 310. It suffices to avoid a space between the exhaust manifold 110 and the cover member 311 at the end (i.e., perimeter) of the insulator 310. Namely, a space situated at the center of the insulator 310 is not a problem as long as this space is not connected to outside atmosphere. In consideration of this, it is preferable to provide a larger bulk density in the end portion (i.e., perimeter portion) of the mat member 312 than in the center portion thereof.

The stud 313 may preferably be bonded to the cover member 311 such that its tip is located at a predetermined distance from the exhaust manifold 110 in order to avoid the lowering of temperature of the exhaust manifold 110. The distance between the stud 313 and the exhaust manifold 110 may preferably be larger than or equal to 0.5 mm. A distance shorter than 0.5 mm between the stud 313 and the exhaust manifold 110 may cause the stud 313 to come in contact with the exhaust manifold 110 due to vibration. This may make it difficult to suppress the lowering of temperature of the exhaust manifold 110.

It may be noted that even if a metal area such as the side end of the cover member 311 constitutes part of the inner surface of the insulator 310, the provision of a sufficient distance between such a metal area and the exhaust manifold 110 serves to prevent physical contact. Even if the metal area of the insulator 310 comes in contact with the exhaust manifold 110, such a contact does not cause a problem when the area size and/or duration of the contact is sufficiently small. It suffices to securely mount the mat member 312 to the cover member 311 by use of the stud 313 or another structure as will be later described, and also to provide an exposed surface of the mat member 312 as the inner surface of the insulator 310 so that the mat member 312 can be brought in close contact with the exhaust manifold 110.

The diameter of the stud 313 may typically be no shorter than 2 mm, and may preferably be 2 to 10 mm. A diameter of the stud 313 larger than or equal to 2 mm may provide sufficient strength.

The insulator 310 may be manufactured by fixedly mounting the mat member 312 to the cover member 311 by use of the stud 313 and then by folding a side end of the cover member 311 to make the folding part 311a.

It may be noted that the mat member 312 may be fixedly mounted to a cover member on which a claw is formed, instead of the cover member 311 on which the stud 313 is formed.

The shape of a claw is not limited to a particular shape as long as it can securely fix the mat member 312. The claw may be a triangular plate, a quadrangular plate, a trapezoidal plate, or the like.

FIGS. 5A through 5D, FIGS. 6A through 6D, and FIGS. 7A and 7B illustrate examples of cover members on which a triangular plate claw, a quadrangular plate claw, and a claw of some other shape are formed, respectively. The claws illustrated in FIGS. 5B and 5D, FIGS. 6B and 6D, and FIG. 7B have a hook part formed thereon. The shape of a hook part is not limited to a particular shape as long as it can fixedly fix the mat member 312. The hook part may be a triangular plate, a quadrangular plate, a trapezoidal plate, or the like. The hook part may be formed such that its tip points toward the flat plate part of the cover member 311 on which the claw is formed. Fibers that are tightly entangled in needle traces and other fibers of the mat member 312 are hooked to this hook part, so that the mat member 312 is securely fixed to the cover member 311.

Figure 6A:
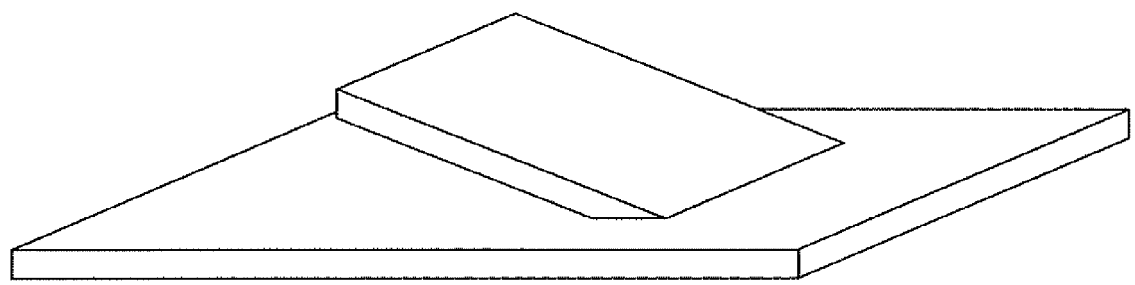
FIGS. 6A through 6D are perspective views illustrating examples of cover members on which one or more quadrangular claws are formed.
Figure 6B:
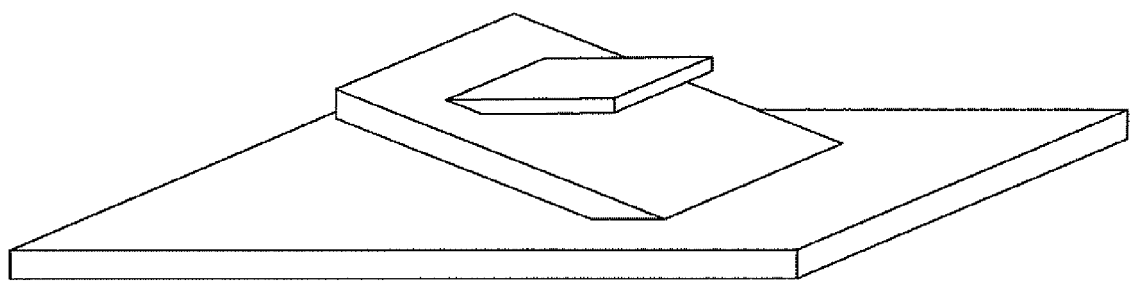
Figure 6C:
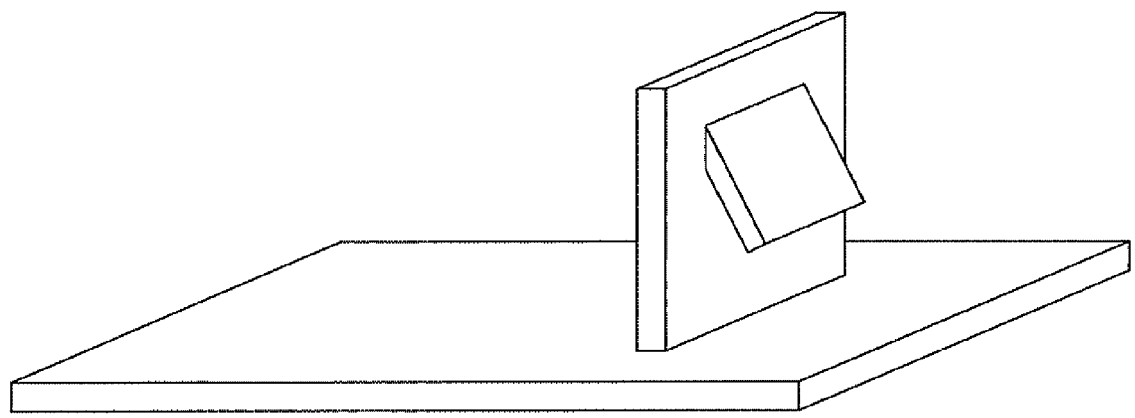
Figure 6D:
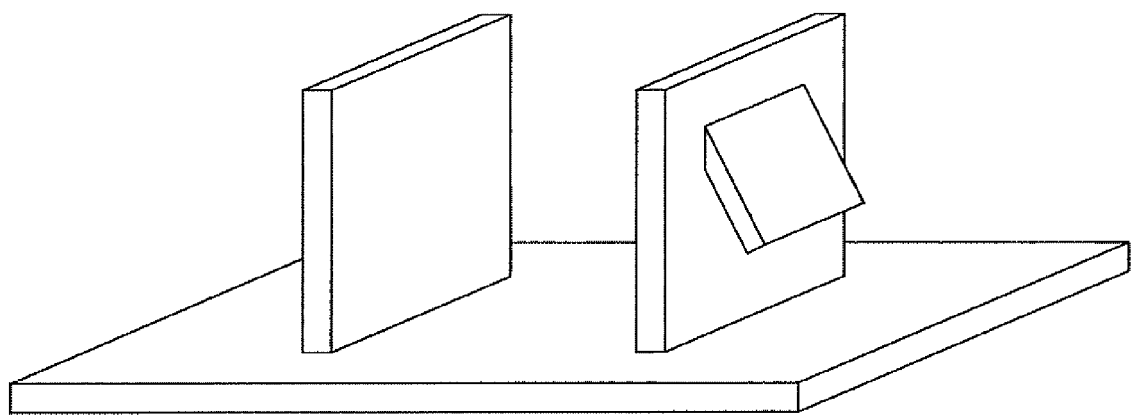
Figure 7A:
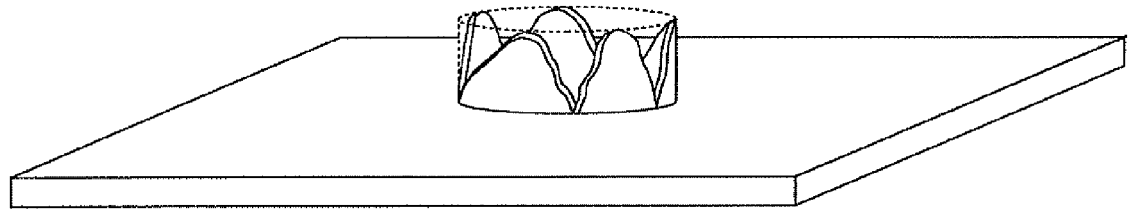
FIGS. 7A and 7B are perspective views illustrating examples of cover members on which claws having a variant shape are formed.
Figure 7B:
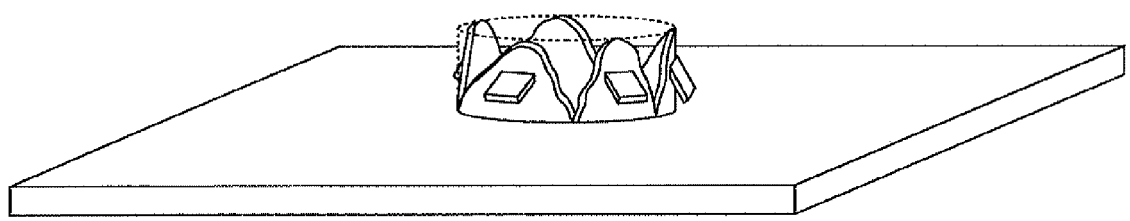

The cover member illustrated in FIG. 6B, for example, may be formed by fixedly mounting a quadrangular claw to a flat plate by welding and by fixedly mounting a quadrangular hook part to the claw by welding.

Other cover members, different from the cover member of FIG. 6B, may be manufactured similarly to the manner described above.

The claw may preferably be formed such that its tip is located at a predetermined distance from the exhaust manifold 110 in order to avoid the lowering of temperature of the exhaust manifold 110. The distance between the claw and the exhaust manifold 110 may preferably be larger than or equal to 0.5 mm. A distance shorter than 0.5 mm between the claw and the exhaust manifold 110 may cause the claw to come in contact with the exhaust manifold 110 due to vibration. This may make it difficult to suppress the lowering of temperature of the exhaust manifold 110.

The surface area size of the claw may typically be 5 to 10 cm$^2$, more or less. The surface area size of the claw may preferably be sufficiently large thereby to allow the mat member 312 to be easily fixed. The surface area size of the claw may preferably be sufficiently small thereby to suppress the lowering of temperature of the exhaust manifold 110.

Two or more claws may be formed on a cover member. Two or more hook parts may be formed on a claw.

Figure 8:
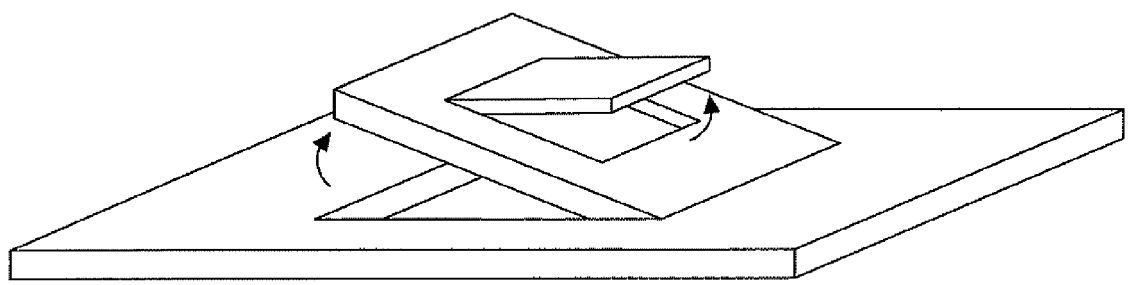
FIG. 8 is a perspective view illustrating a variation of the cover member of FIG. 6B.

FIG. 8 is a drawing illustrating a variation of the cover member of FIG. 6B. This cover member may be made by cutting a flat plate along solid lines illustrated in FIG. 9 and then by folding the inner parts at dotted lines. This requires no welding, thereby allowing easy manufacturing. Further, the angles at which the claw and hook part are arranged can be easily adjusted, which allows the mat member 312 to be easily fixed.

Figure 9:
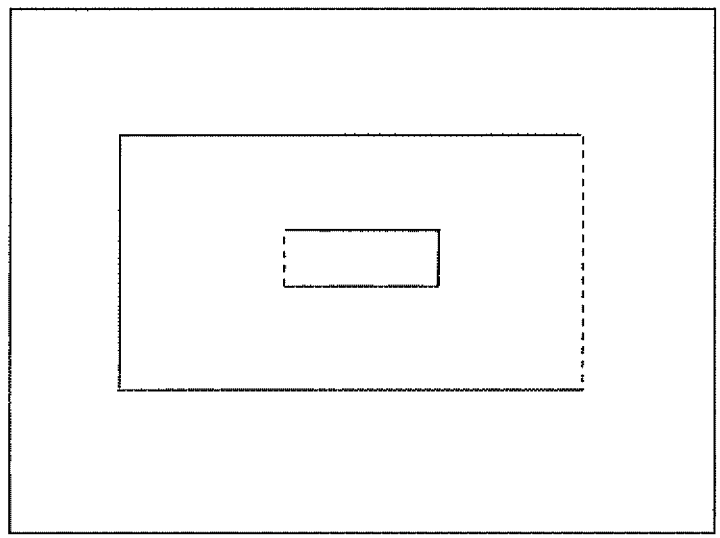
FIG. 9 is a plan view illustrating a method of making the cover member of FIG. 8.

Other cover member variations, different from the cover member of FIG. 9, may be manufactured similarly to the manner described above.

It may be noted that the mat member 312 may be fixedly mounted to a cover member that is punch pressed, instead of the cover member 311 on which the stud 313 is formed.

Figure 10A:
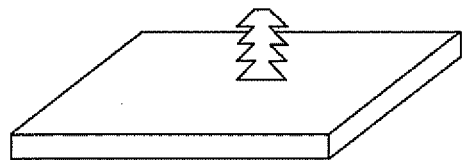
FIGS. 10A and 10B are perspective views illustrating the shapes of punch-pressed parts.
Figure 10B:
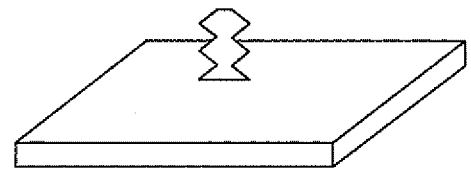

The punch-pressed shape is not limited to a particular shape as long as it can securely fix the mat member 312. Examples of such a shape are illustrated in FIGS. 10A and 10B.

The punch-pressed part may preferably be formed such that its tip is located at a predetermined distance from the exhaust manifold 110 in order to avoid the lowering of temperature of the exhaust manifold 110. The distance between the punch-pressed part and the exhaust manifold 110 may preferably be larger than or equal to 0.5 mm. A distance shorter than 0.5 mm between the punch-pressed part and the exhaust manifold 110 may cause the punch-pressed part to come in contact with the exhaust manifold 110 due to vibration. This may make it difficult to suppress the lowering of temperature of the exhaust manifold 110.

Figure 11:
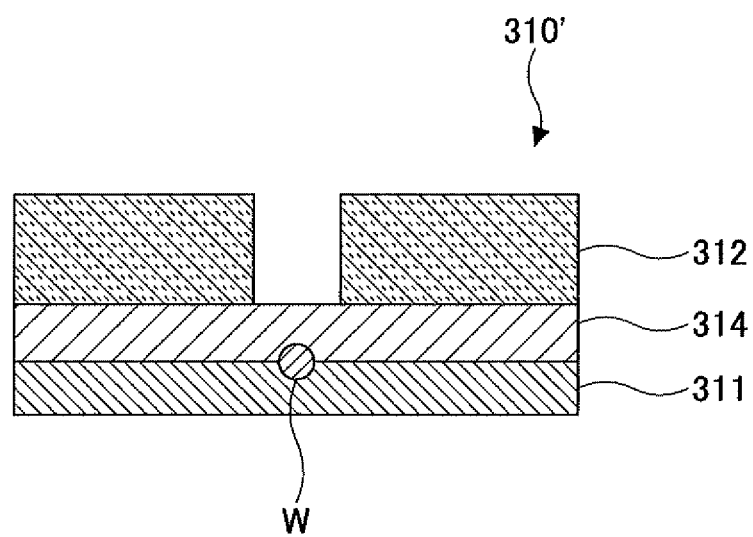
FIG. 11 is a perspective view illustrating an example of a variation of the insulator of FIG. 2.

FIG. 11 is a drawing illustrating a variation of the insulator 310. An insulator 310' is configured such that a joint member 314 made of stainless steel fiber is fixed to the cover member 311 by stop welding W, and such that the mat member 312 is bound to the joint member 314. The mat member 312 has a gap (i.e., opening) for the purpose of the spot welding W. This gap disappears when the insulator 310' is attached to the exhaust manifold 110. This suppresses the lowering of temperature of the exhaust manifold 110. In some cases, the above-noted gap may remain. Even in such cases, this gap is situated at the center of the insulator 310', and will not be connected to outside atmosphere.

The mechanism for binding the mat member 312 to the joint member 314 is not limited to a particular mechanism as long as it exhibits sufficient heat-resistant characteristics. For example, needling, stitching, stapling, or the like may be used.

The material of the joint member 314 is not limited to stainless steel fiber as long as it can be fixed to the cover member 311 by spot welding W. The material may be another metal fiber such as iron fiber, aluminum fiber, or copper fiber, or may be a combination of two or more of these fibers. Particularly, iron fiber or stainless steel fiber may be preferable since the use of such a fiber allows the insulator 310' to be fixed by welding to an exhaust pipe such as the exhaust manifold 110.

The specific weight of the joint member 314 is not limited to a particular value as long as the mat member 312 can be bound to the joint member 314. The specific weight may typically be 300 to 1500 g/m², and may preferably be approximately 1000 g/m².

The insulator 310' may be manufactured by binding the mat member 312 to the joint member 314 and then by fixing the joint member 314 together with the mat member 312 to the cover member 311 by spot welding W.

The exhaust manifold 110 to which the insulator 310 is attached has a mounting part 111 at the end opposite to the end that faces the folding part 311a of the cover member 311. A bolt hole 111a is formed in this mounting part 111. A bolt 112 is used to mount the insulator 310 on the exhaust manifold 110 in a detachable manner.

The purification apparatus 120 includes a carrier 121 carrying a diesel oxidation catalyst (DOC) and a diesel particulate filter (DPF) 122 around which a support seal member is arranged, all of which are accommodated in a metal container 123. The diesel oxidization catalyst oxidizes carbon monoxide (CO) and carbon hydride (HC) contained in exhaust gas. The diesel particulate filter catches particle matter (PM) contained in exhaust gas, and lets it burn.

An insulator 320 is attached to the outer surface of the purification apparatus 120 in a detachable manner. The insulator 320 may be the same as or similar to the insulator 310, and can be mounted in a detachable manner similar to the manner in which the insulator 310 is mounted. This arrangement suppresses the lowering of temperature of the purification apparatus 120, thereby avoiding the lowering of catalytic functions of both the purification apparatus 120 and the purification apparatus 140, which will be described later.

An insulator 330 is attached to the outer surface of the exhaust pipe 130 in a detachable manner. The insulator 330 may be the same as or similar to the insulator 310, and can be mounted in a detachable manner similar to the manner in which the insulator 310 is mounted. This arrangement suppresses the lowering of temperature of the exhaust pipe 130, thereby avoiding the lowering of catalytic function of the purification apparatus 140, which will be described later.

The purification apparatus 140 performs selective catalytic reduction with respect to NOx. The purification apparatus 140 includes a catalyst carrier 141 around which a support seal member is arranged, all of which are accommodated in a metal container 142. It may be noted that aqueous urea solution together with compressed air is spurted into the exhaust pipe 130 situated immediately upstream relative to the purification apparatus 140 to be mixed with exhaust gas.

An insulator 340 is attached to the outer surface of the purification apparatus 140 in a detachable manner. The insulator 340 may be the same as or similar to the insulator 310, and can be mounted in a detachable manner similar to the manner in which the insulator 310 is mounted. This arrangement suppresses the lowering of temperature of the purification apparatus 140, thereby avoiding the lowering of catalytic function of the purification apparatus 140.

In the present embodiment, the insulators 310, 320, 330, and 340 are attached in a detachable manner to the exhaust manifold 110, the purification apparatus 120, the exhaust pipe 130, and the purification apparatus 140, respectively. Alternatively, at least one but not all of the insulators 310, 320, 330, and 340 may be used, with the remaining insulators being conventional insulators.

A turbo charger may be provided in which the energy of exhaust gas passing through the exhaust manifold 110 is utilized to rotate a turbine thereby to drive a centrifugal compressor. The turbo charger then supplies the compressed air to the diesel engine 200.

An insulator is attached to the outer surface of the turbo charger in a detachable manner. The insulator may be the same as or similar to the insulator 310, and can be mounted in a detachable manner similar to the manner in which the insulator 310 is mounted. This arrangement suppresses the lowering of temperature of the turbo charger, thereby allowing the energy of exhaust gas to be efficiently utilized, and also avoiding the lowering of catalytic functions of the purification apparatuses 120 and 140.

An exhaust gas recirculation may be provided by which part of the exhaust gas passing through the exhaust manifold 110 is extracted and supplied to an intake manifold for second-time intake.

In the present embodiment, the exhaust system 100 has been described as that of a diesel engine. This is a nonlimiting example, and the exhaust system is not limited to that of a particular type of engine. It may be an exhaust system of a gasoline engine.

EXAMPLE

Example 1

The mat member 312 having a size of 100 mm×100 mm×4 mm and made of alumina fiber was used The joint member 314 was stainless steel fiber (SUS434), which had a size of 100 mm×100 mm and a specific weight of 300 to 1500 g/m². Needling was performed at 350 needling points per cm² from the joint-member side toward the mat member side, thereby binding the joint member 314 and the mat member 312. The joint member 314 bound to the mat member 312 was fixed by spot welding W to the cover member 311 made of a stainless steel plate (SUS409) having a size of 100 mm×100 mm×1.5 mm, thereby producing the insulator 310' (see FIG. 9).

Example 2

The insulator 310' was obtained in the same manner as in the first example, except that the mat member 312 was bound to the joint member 314 by stitching at 3-mm intervals using a metal fiber that is 0.2 mm in diameter.

Comparative Example 1

A mat member having a size of 100 mm×100 mm×4 mm and made of alumina fiber was placed on a cover member that was a stainless steel plate (SUS409) having a size of 100 mm×100 mm×1.5 mm. Further, a plain-woven mesh in which metal fibers having a diameter of 0.2 mm were provided at 0.50-mm intervals was placed on top of the mat member. Spot welding was then performed to fix them together to produce an insulator.

Comparative Example 2

A mat member having a size of 100 mm×100 mm×4 mm and made of alumina fiber was fixed by an adhesive agent to a cover member that was a stainless steel plate (SUS409) having a size of 100 mm×100 mm×1.5 mm, thereby producing an insulator. The adhesive agent was ARON CERAMIC D (manufactured by TOAGOSEI CO., LTD).

[Heat Insulation]

A stainless steel plate (SUS409) having a size of 100 mm×100 mm×1.5 mm and an insulator were successively placed on a hotplate CH-180 (manufactured by ASONE). A thermocouple was used to measure a difference in temperature between the front surface and back surface of the stainless steel when the hotplate was set equal to 300 degrees Celsius. A household electrical fan DF35A (manufactured by Toshiba Corporation) on the WEAK setting was used to blow air to the heater from a distance of 1 m and from a height of 60 cm. Heat insulation was checked by comparing a difference between the front-and-back-surface temperature difference obtained in the presence of blowing air and the front-and-back-surface temperature difference in the absence of blowing air.

Such a test on heat insulation serves to evaluate the effect of suppressing the lowering of temperature with respect to an exhaust system of an internal-combustion engine when such lowering occurs due to an air current flowing into a gap between the cover member and the mat member.

[Strength Against Heat]

Strength against heat was evaluated by performing 10 thermal cycles, each of which included keeping the insulator at 600 degrees Celsius for one hour and then cooling it down to room temperature. Check results were either "OK" for the case in which the mat member did not fall off upon lifting the cover member or "NG" for the case in which the mat member fell off upon lifting the cover member.

Table 1 shows the results of evaluations.

TABLE 1

| | Heat Insulation | | | |
| --- | --- | --- | --- | --- |
| | Temperature Difference [° C.] | | Difference in Temperature | Strength |
| | Air Blow | No Air Blow | Deference [° C.] | against Heat |
| Example 1 | 79 | 81 | 2 | OK |
| Example 2 | 83 | 88 | 5 | OK |
| Comparative Example 1 | 118 | 148 | 30 | OK |
| Comparative Example 2 | 74 | 78 | 4 | NG |

Table 1 indicates that the insulators of Examples 1 and 2 exhibited superior heat insulation and superior strength against heat. Further, the insulator of Comparative Example 1 had inferior heat insulation because of a gap created between the cover member and the mat member. Moreover, the insulator of Comparative Example 2 had inferior strength against heat because of the use of adhesive for connecting the mat member to the cover member.

Further, the present invention is not limited to these embodiments, but various variations and modifications may be made without departing from the scope of the present invention.

The present application is based on Japanese priority application No. 2010-012502 filed on Jan. 22, 2010, with the Japanese Patent Office, the entire contents of which are hereby incorporated by reference.

What is claimed is:

1. An insulator having an inner surface for covering an exhaust system of an internal-combustion engine, comprising:
   a cover member having a surface;
   a joint member formed on the surface of the cover member; and
   a mat member made of material including at least one of ceramic fibers and glass fibers, the mat member being attached to the cover member through binding of the fibers to the joint member, and the mat member being exposed to form the inner surface,
   wherein the joint member includes one or more projections sticking out from the surface of the cover member, each of the projections having a hook part mounted thereto,
   wherein the mat member has needle traces where fibers of the needle traces are entangled with each other,
   wherein the one or more projections and the hook part are entangled with the needle traces so as to securely fix the mat member to the cover member, and
   wherein the hook part is any one of triangular plate, a quadrangular plate, and a trapezoidal plate, and is fixed to the projection by welding.

2. The insulator as claimed in claim 1, wherein the joint member is one or more studs formed on the surface of the cover member.

3. The insulator as claimed in claim 1, wherein the joint member is one or more claws formed on the surface of the cover member.

4. The insulator as claimed in claim 1, wherein the needle traces are made by inserting and removing needles through a sheet from which the mat member is produced.

5. The insulator as claimed in claim 1, wherein each of the needle traces has a straight line shape extending in a given direction, and wherein the fibers of the needle traces are entangled with each other and substantially oriented in the given direction.

6. The insulator as claimed in claim 1, wherein an end of the joint member opposite to an end thereof attached to the cover member is not exposed from the inner surface of the mat member.

7. The insulator as claimed in claim 1, wherein the joint member is made of material including metal fibers, and is welded to the surface of the cover member.

8. The insulator as claimed in claim 7, wherein the mat member is bound to the joint member through one of needling, stitching, and stapling.

9. The insulator as claimed in claim 7, wherein the metal fibers include at least one of iron, aluminum, copper, and stainless steel.

10. The insulator as claimed in claim 1, wherein the ceramic fibers include at least one of alumina, silica, silica alumina, and rock wool.

11. An exhaust system for an internal-combustion engine, comprising:
    a tubular member through which exhaust gas travels; and
    an insulator having an inner surface to cover an outer surface of the tubular member, the insulator comprising:
    a cover member having a surface;
    a joint member formed on the surface of the cover member; and
    a mat member made of material including at least one of ceramic fibers and glass fibers, the mat being attached to the cover member through binding of the fibers to the joint member, and the mat being exposed to form the inner surface,
    wherein the joint member includes one or more projections sticking out from the surface of the cover member, each of the projections having a hook part mounted thereto,
    wherein the mat member has needle traces where fibers of the needle traces are entangled with each other,
    wherein the one or more projections and the hook part are entangled with the needle traces so as to securely fix the mat member to the cover member, and
    wherein the hook part is any one of triangular plate, a quadrangular plate, and a trapezoidal plate, and is fixed to the projection by welding.

12. The exhaust system as claimed in claim 11, wherein the needle traces are made by inserting and removing needles through a sheet from which the mat member is produced.

13. The exhaust system as claimed in claim 11, wherein each of the needle traces has a straight line shape extending in a given direction, and wherein the fibers of the needle traces are entangled with each other and substantially oriented in the given direction.

14. The exhaust system as claimed in claim 11, wherein an end of the joint member opposite to an end thereof attached to the cover member is not exposed from the inner surface of the mat member.

15. The exhaust system as claimed in claim 11, wherein the joint member is made of material including metal fibers, and is welded to the surface of the cover member.

16. The exhaust system as claimed in claim 15, wherein the mat member is bound to the joint member through one of needling, stitching, and stapling.

\* \* \* \* \*